United States Patent [19]
Knipp et al.

[11] 3,857,550
[45] Dec. 31, 1974

[54] MACHINE FOR PRODUCING FOAMS, HOMOGENEOUS OR STRUCTURAL MATERIALS FROM AT LEAST TWO LIQUID REACTION COMPONENTS

[75] Inventors: Ulrich Knipp, Schildgen; Heinrich Boden, Opladen; Heinrich Ersfeld, Bergisch-Neukirchen; Walter Schneider, Bensberg; Reiner Moeres, Siegburg, all of Germany

[73] Assignee: Bayer Aktiengesellschaft, Leverkusen, Germany

[22] Filed: Apr. 12, 1973

[21] Appl. No.: 350,675

[30] Foreign Application Priority Data
Apr. 20, 1972 Germany............................ 2219389

[52] U.S. Cl. ................................. 259/4, 23/252 R
[51] Int. Cl............................................. B01f 15/02
[58] Field of Search............. 259/4, 7, 8, 18, 23, 24, 259/43, 44; 23/252 R; 251/248, 250, 318, 319

[56] References Cited
UNITED STATES PATENTS

| | | | |
|---|---|---|---|
| 3,203,675 | 8/1965 | Ward..................................... | 259/7 |
| 3,207,486 | 9/1965 | Rosenthal............................. | 259/8 |
| 3,559,955 | 2/1971 | Lucas.................................... | 259/8 |
| 3,753,554 | 8/1973 | Muller................................... | 259/8 |

*Primary Examiner*—Robert W. Jenkins
*Attorney, Agent, or Firm*—Gene Harsh

[57] ABSTRACT

In the mixing head of a foaming machine, the delivery pipes open into slides displaceable in the mixing head and provided with injection openings, the wall of the mixing chamber having a cutout for each slide valve in which part of the wall surface of the slide valve forms the wall of the mixing chamber.

15 Claims, 22 Drawing Figures

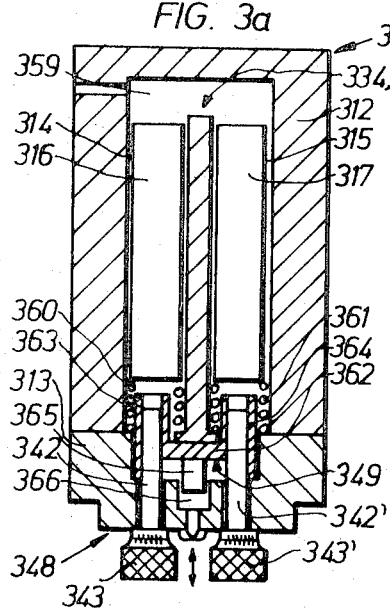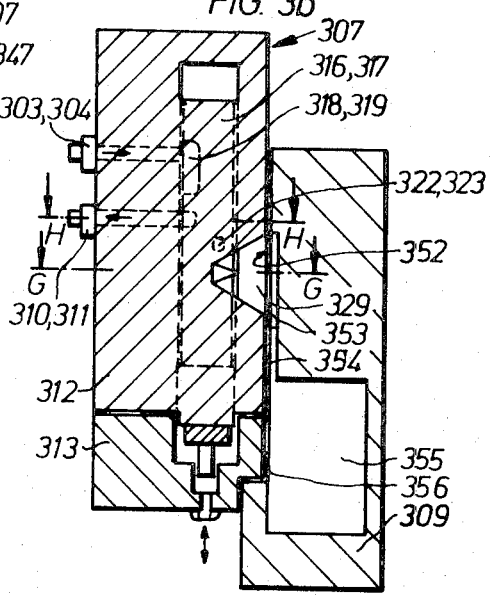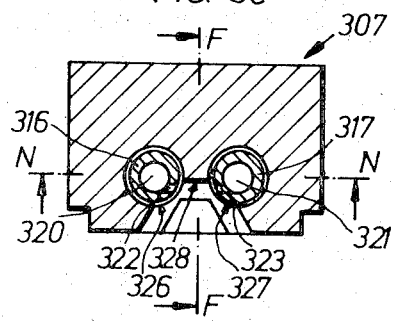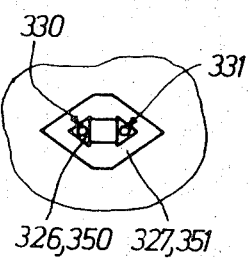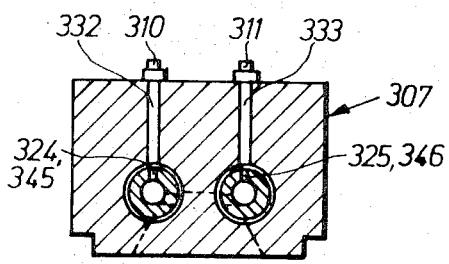

MACHINE FOR PRODUCING FOAMS, HOMOGENEOUS OR STRUCTURAL MATERIALS FROM AT LEAST TWO LIQUID REACTION COMPONENTS

This invention relates to an apparatus for mixing at least two liquid reaction components, consisting of storage containers for the components and of delivery pipes which lead to a mixer comprising a mixing chamber, slide valves coupled with one another for movement being associated with the delivery pipes.

Machines of this kind are used for the continuous production of sheet-form or block-form material and, more particularly, for the batch production of mouldings through the introduction of a certain quantity of the reactive mixture into a mould.

The first main component used in the production of homogeneous or cellular polyurethanes are, for example, polyhydroxyl compounds with at least two hydroxyl groups and molecular weights of from 62 to 10,000, preferably from 62 to 5,000, for example polyesters, polyethers, polythioethers, polyacetals, polycarbonates, polyesteramides containing at least two, generally two to eight, but preferably two hydroxyl groups. The second main component consists primarily of aliphatic, cycloaliphatic, araliphatic and aromatic polyisocyanates, more particularly polyisocyanates of the kind which can readily be obtained on an industrial scale, for example 2,4- and 2,6-tolylenediisocyanate and any mixtures of these isomers and polyphenyl-polymethane polyisocyanates. Machines of the kind in question can also be used for processing so-called two-component resins, such as polyester resins and epoxide resins There are essentially two types of machine in common use, namely the so-called high-pressure machines and the so-called low-pressure machines.

The high-pressure machines are equipped with spring-loaded injection nozzles which open and close automatically under the pump pressure. They function with injection pressures of from about 30 to several hundred atms. These high injection pressures provide for thorough admixture. One disadvantage is the frequent leading and lagging of a reaction component on entry into the mixing chamber. Thus, an unmixed residue of one component can enter the mould, resulting in the formation of a fault which either reduces the strength of the moulding or even spoils the appearance of visible surfaces. In cases where fillers are introduced with the components, the nozzles undergo heavy wear and no longer close tightly.

Low-pressure machines function with injection pressures in a range from about 2 to 50 atms. Accordingly, the working-pressure ranges of both types of machine overlap one another. Low-pressure machines do not provide such thorough admixture as high-pressure machines unless the mixing chamber is equipped with an additional stirrer. Low-pressure machines are generally equipped with shut-off slides in the delivery pipes for the components. Since these shut-off slides are somewhat remote from the openings of the delivery pipes into the mixing chamber for structural reasons, the residues of component left between the slides and openings in the delivery pipes result in the leading or lagging of a component in the same way as in high-pressure machines. Accordingly, the same faults appear in the end product.

Many attempts have been made to obviate these disadvantages. However, all these efforts retained the same fundamental principles and achieved thorough admixture of the components through additional fittings, for example by using positively controlled nozzles instead of the automatic injection nozzles. These technical improvements make the machine more complicated and less reliable in operation. Apart from the greater outlay involved in their construction, machines of this kind are often unable to withstand the rough operation to which they are subjected.

Accordingly, the object of the invention is to provide a machine which can be operated both in the low-pressure range and also in the high-pressure range, which avoids the leading or lagging of a component and which, nevertheless, satisfies functional requirements, especially in regard to robustness, and also enables fillers to be incorporated.

According to the invention, this object is achieved by virtue of the fact that slide valves are arranged at the ends of the delivery pipes and comprise injection openings, and further by virtue of the fact that, for each slide valve, the wall of the mixing chamber has a cutout in which part of the outer surface of the slide valve forms the wall of the mixing chamber.

In this way, the components are introduced synchronously into the mixing chamber in a simple and safe manner and, when the slide valves are switched, are synchronously shut-off, thus avoiding faults in the end product.

There are two alternative preferable structural embodiments for the slide valves, namely rotary slide valves or axial slide valves. Slide valves of both types are known in a variety of different modifications with mechanical, hydraulic, pneumatic or electromagnetic operation for a variety of different technical fields.

However, since at least two slide valves arranged close to the mixing chamber have to be present in the present case, favourable structural solutions are possible according to particular embodiments of the invention: Where the slide valves are in the form of rtary slides, the rotary slides may comprise interengaging gearwheels one of which meshes with a rack provided with an adjusting drive. The adjusting drive is designed to be actuated either automatically or manually, by a push button, depending upon the type of installation in which the machine according to the invention is fitted. When the machine is switched on, the rack turns the rotary slide valves so that the injection openings come to rest in the cutouts in the wall of the mixing chamber. The jets issuing from the injection openings are directed oppositely to one another. In the closed position, the injection openings are sealed off by the walls of the cylindrical bores in which the rotary slide valves are arranged.

In an alternative embodiment of the slide valves as axial slide valves, the axial slide valves are connected to a hydraulic or pneumatic adjusting mechanism.

In this case, the slide valves are mounted for example on a yoke which is guided by means of a piston in a cylindrical bore in the housing of the mixing chamber, so that the axial slide valves are able to make an axial stroke in order to move from the rest position into the working position and vice versa. The piston can work against return springs or can even be double-acting. In exactly the same way as for the rotary slides, the injection openings are again situated in the cutouts in the wall of the mixing chamber in the working position, but are sealed off in the rest position.

The degree of mixing of the components is entially determined by the injection pressures which, given fixed machine parameters such as pump output and pipe flow resistances are in turn governed by the viscostiy of the components which changes with any change in the chamical composition of the mixture Accordingly, another object of the invention is to make it possible to obtain optimum adjustment of the injection pressures.

According to a first particular embodiment, the edges of the cutouts in the wall of the mixing chamber are in the form of control edges, and adjustable stop means are associated with the slide valves in the working-position direction. By virtue of these stop means, the injection openings can be partly masked by limiting the strokes of the slide valves, so that the injection pressures can be adjusted.

According to a second particular embodiment in which rotary slide valves are used, the edges of the cutouts in the wall of the mixing chamber are in the form of control edges, and the rotary slide valves comprise independent axial adjusting means. The particular advantage of this more elaborate embodiment is that the opening and closing operation is completely separate from the operation by which the injection pressures are adjusted. Adjustment can be carried out much more accurately.

A third particular embodiment in which axial slide valves are used, is distinguished by the fact that the edges of the cutouts in the wall of the mixing chamber are in the form of control edges and the axial slide valves comprise a rotary adjusting means. This embodiment has the same advantages as the equivalent embodiment described above in which rotary slide valves are used.

In all these embodiments, the control edges are preferably inclined to the vertical, thus providing for more accurate adjustment.

According to another particular embodiment of the machine according to the invention, the slide valves comprise return bores which correspond with associated return pipes in the rest position of the slide valve.

By virtue of this measure, the pumps are able to continue operating, even during the rest periods, thus eliminating the fluctuations in pressure caused by repeated starting and stopping of the pumps. However, this recycling of the components is already known in principle in machines of this kind.

One throttle zone is preferably arranged in each of the return pipes. This throttle zone enables a certain pressure level to be adjusted during recycling. Experience has shown that the best working conditions are obtained when the circuit pressures are similar to the working pressures in the delivery pipes because, in this case, no fluctuations in pressure occur during reversal.

The return bores in the slide valves are advantageously in the form of throttle zones. The throttle zones are preferably adjustable in their throughflow cross-section.

According to one particular embodiment, the free cross-sections of the throttle zones and those of the injection openings are adapted to one another in each slide valve to enable optimum pressure conditions to be obtained. It is particularly favourable to adapt these free cross-sections to one another in such a way that the circuit pressures correspond at least to the injection pressures.

According to one embodiment, the mixing chamber of the machine has a closed construction in the usual way, apart from inlet and outlet openings. In other words, although it can generally be opened, it is only ever opened for cleaning or repair purposes. In order to prevent deposits of fully reacted mixture from accumulating, the mixing chamber can be flushed out in the usual way by running a component through it, or alternatively it is provided with an inlet opening for compressed air or for a flushing solvent.

One of the requirements which mixing chambers of this kind have recently had to satisfy is that they should be in two sections.

According to a particular embodiment of the machine according to the invention, a dividing plane runs through the mixing chamber. In conjunction with a quick-action closure, this mixing chamber consisting of two housing sections is more quickly accessible for cleaning purposes.

According to another embodiment, the mixing machine is mounted on a mould and has a common dividing plane with the dividing plane of the mould, the interior of the mixing chamber being free from any undercuts.

The advantage of this basically already known arrangement is that, when the moulding is removed from the mould, the mixing chamber and any sprues present, which are best situated in the dividing plane, can be opened at the same time as the mould in the dividing plane. The moulding can be removed from the mould as a unit with the sprue and the remains of the mixture reacted in the mixing chamber. A stirrer-free embodiment in particularly preferred in this case or, alternatively, it is necessary to use a so-called lost stirrer which can only be used once because it remains behind in the fully reacted mixture remains.

According to the invention, the danger of the mixture residue fully reacted in the mixing chamber sticking to the wall of the mixing chamber is avoided by providing the slides with a stripping means. In the case of rotary slide valves, this stripping means is designed to produce brief rotation or, in the case of axial slide valves, a short stroke movement so that the residue of mixture adhering to the walls of the mixing chamber is detached because it is the actual transitions from the edges of the cutouts in the wall of the mixing chamber to the surfaces of the slide valves that are particularly susceptible to sticking of the reaction mixture. A very short movement amounting to fractions of a millimetre is all that is required. The edges of the cutouts act as sealing scrapers.

In cases where rotary slide valves are used, the stripping means advantageously consists of the adjusting drive for the rotary slide valves which, for this purpose, comprises a travel stop.

In cases where axial slide valves are used, the stripping means consists correspondingly of a hydraulic or pneumatic adjusting mechanism for the axial slide valves which, for this purpose, comprises a travel stop.

The function of the travel stops is to interrupt the movements of the slide valve in a predetermined position during the stripping operation so that the injection openings of the slide valve remain covered, thus preventing the components from flowing into the mixing chamber during this operation.

Each rotary slide valve or axial slide valve is preferably provided with a cavity. These cavities are arranged in such a way that they are situated in the cutouts in the wall of the mixing chamber during reaction of the mixture residue in the mixing chamber. As a result, some of the mixture residue is also situated in these cavities. Providing these cavities are suitable in shape, a pressure is applied to the reacted mixture residue by the rotary movement or stroke movement of the slide valves, with the result that the mixture residue is readily detached from the wall of the mixing chamber and can be removed from the mould without any difficulty. The cavities are arranged in such a way that, during the stripping movement of the slide valves, the injection openings are still sealed off by the wall of the housing.

The machine according to the invention illustrated purely diagrammatically in several embodiments in the accompanying drawing is described in detail in the following. In the accompanying drawings:

FIG. 2c is a section on the line C—C in FIG. 2a.

FIG. 2d is a section on the line D—D in FIG. 2a.

FIG. 3a shows another embodiment of the mixer with axial slide valves and adjustable stops in longitudinal section on the line N—N in FIG. 3c.

FIG. 3b is a section on the line F—F in FIG. 3c.

FIG. 3c is a section on the line G—G in FIG. 3b.

FIG. 3d is a section on the line H—H in FIG. 3b.

FIG. 3e is a view of the mixing chamber showing the cutout.

FIG. 4b is a section on the line K—K in FIG. 4a.

FIG. 5b is a section on the line M—M in FIG. 5a.

Figure 1:
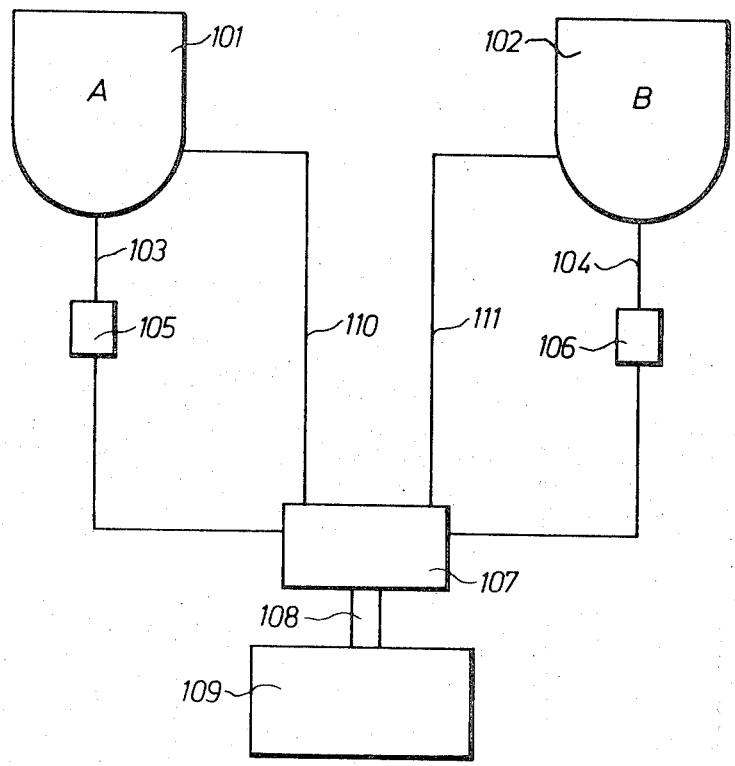
FIG. 1 is a block diagram of the machine as a whole.

As shown in FIG. 1, the machine consists of two storage containers 101 and 102. The component A in the storage container 101 is an isocyanate, whilst the component B in the storage container 102 is a polyol. Delivery pipes 103 and 104 in which metering pumps 105 and 106 are provided, lead off from the storage containers 101 and 102 and open into a mixer 107, of which the outlet opening 108 is adjoined by a mould 109. The return pipes 110 and 111 lead back to the storage containers 101 and 102.

The method of operation is as follows:

The metering pumps 105 and 106 pump the components A and B from the storage containers 101 and 102 along the delivery pipes 103 and 104 into the mixer 107. During the working periods, the components A and B flow through reversing members (not shown) into a mixing chamber (not shown) which they leave through the outlet opening 108 after thorough admixture, to enter a mould 109. The metering pumps 105 and 106 continue to function during the interval between two mould-filling operations. However, the components A and B are pumped back in a circuit into the storage containers 101 and 102 through the return pipes 110 and 111.

As shown in FIGS. 2a to 2f, the mixer 207 consists of two housing sections 212 and 213 which are connected tightly together by screw bolts (not shown). Bores 214 and 215, into which rotary slide valves 216 and 217 are fitted for easy rotation, but nevertheless tightly, are arranged in the housing section 212.

Figure 2A:
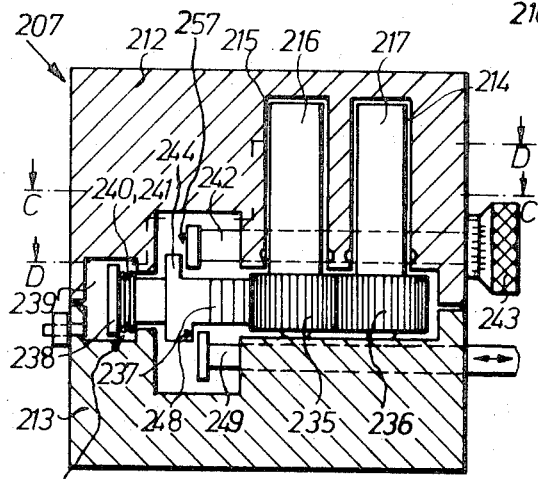
FIG. 2a shows a first embodiment of the mixer with rotary slide valves and adjustable stops in partial longitudinal section on the line A—A of FIG. 2c.
Figure 2B:
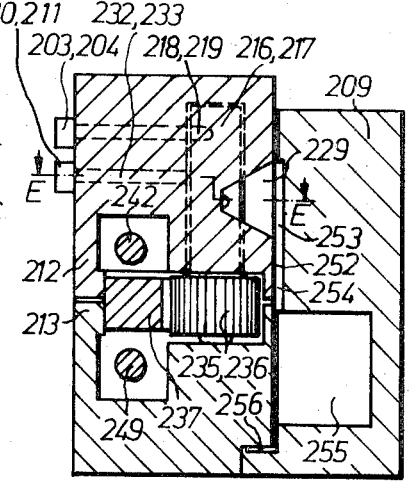
FIG. 2b is a section on the line B—B in FIG. 2c.
Figure 2C:
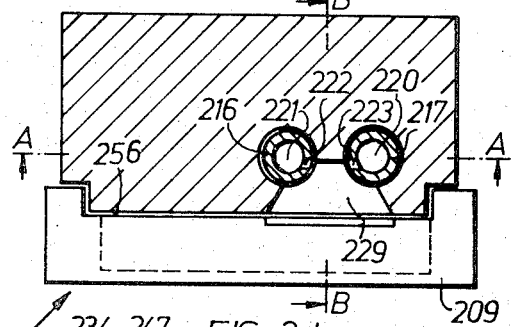
Figure 2E:
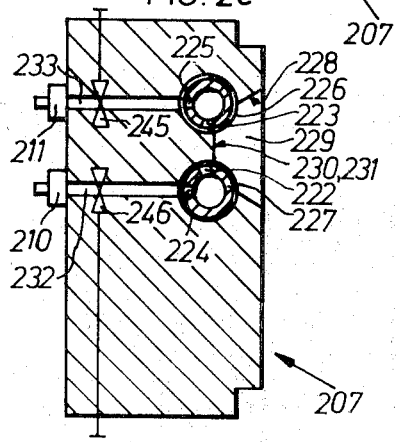
FIG. 2e is a section on the line E—E in FIG. 2b.
Figure 2D:
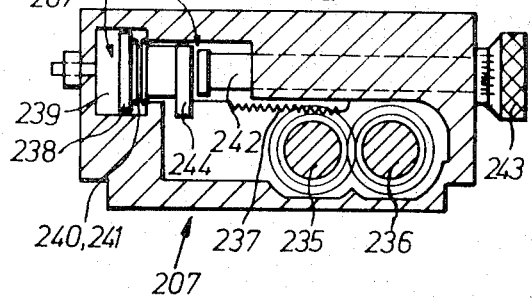
Figure 2F:
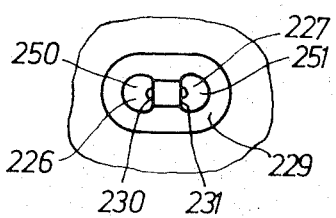
FIG. 2f is a view of the mixing chamber showing the cutout.

Towards the delivery pipes 203 and 204, the rotary slide valves 216 and 217 comprise slots 218 and 219 (FIG. 2b) which, in each position, connect the delivery pipes 203 and 204 to the hollow interiors 220 and 221 (FIG. 2c) of the rotary slide valves 216 and 217. In addition, the rotary slide valves 216 and 217 comprise injection openings 222 and 223 and return bores 224 and 225 (FIG. 2e). In the working position, the injection openings 222 and 223 point through cutouts 226 and 227 in the wall 228 into a mixing chamber 229 being directed substantially oppositely to one another (FIG. 2c). The edges of the cutouts 226 and 227 act as control edges 230 and 231 (FIG. 2f). In this position, the return bores 224 and 225 in the housing bores 214 and 215 are completely closed. By contrast, in the rest position, the rotary slide valves 216 and 217 are turned in such a way that the injection openings 222 and 223 in the housing bores 214 and 215 are complete closed, whilst the return bores 224 and 225 coincide with the connections 232 and 233 of the return bores 210 and 211, so that the reaction components are circulated while the pumps continue to function (FIG. 2e).

The rotary slides 216 and 217 are provided with an adjusting drive 234. This adjusting drive consists of interengaging gearwheels 235 and 236 arranged on the slide valves 216 and 217. The gearwheel 235 meshes with a rack 237, whose end is in the form of a hydraulic piston 238 and is designed to be hydraulically actuated in a cylinder bore 239 (FIG. 2a and FIG. 2d). When the piston 238 is actuated, the rotary slide valves 216 and 217 are turned into the working position. The rotary slide valves 216 and 217 are returned to the rest position by return springs 240 and 241. The injection pressures for the components can be adjusted together by virtue of the fact that the stroke of the rack 237 is adjustable through a stop mechanism 257 consisting of a stop pin 242 which is mounted in the housing section 212 and which comprises a micrometer screw 243 at its projecting end. Its other end corresponds with a stop 244 of the rack 237. In this way, the injection openings 222 and 223 can be adjusted in such a way that they are partially covered by the control edges 230 and 231 (FIG. 2f) because the free cross-section which governs the injection pressure can be adjusted in this way.

Throttle zones 245 and 246 are provided in the connections 232 and 233 of the return pipes 210 and 211.

The rotary slide valves 216 and 217 are equipped with a stripping means 247 which merely represents a particular embodiment of the adjusting drive 234 in which the rack 237 has a second stop 248 against which works a second movable stop pin designed to function as a travel stop 249 (FIG. 2a). It can be adjusted in such a way that the rotary slide valves 216 and 217 are able to make a short rotary movement. It is sufficient for their surfaces 250 and 251 (FIG. 2f) to be displaced by about 2mm. Under no circumstances should the injection openings 222 and 223 in the cutouts 226 and 227 become visible or leak.

The mixing chamber 229 widens outwards on all sides and is open at its wide end 252. The mixer 207 is applied to a mould 209 (FIGS. 2b and 2c) whose inlet opening 253 adjoins the mixing chamber 229. A sprue 254 leads to the mould cavity 255. A dividing plane 256 runs between the mixer 207 and the mould 209 so that, when the mixer 207 is switched off, the moulding can be removed as a unit together with the sprue and fully reacted contents of the mixing chamber.

In the embodiment illustrated by way of example in FIGS. 3a to 3d, the mixer 307 consists of two housing sections 312 and 313 which are joined tightly together by screw bolts (not shown). Bores 314 and 315 into which axial slide valves 316 and 317 are fitted for easy displacement, but nevertheless tightly, are arranged in the housing section 312.

Towards the delivery pipes 303 and 304, the axial slides 316 and 317 comprise longitudinal slots 318 and 319 (FIG. 3b) which in any position connect the delivery pipes 303 and 304 to the hollow interiors 320 and 321 (FIG. 3c) of the axial slide valves 316 and 317. In addition, the injection openings 322 and 323 point through cutouts 326 and 327 in the wall 328 into a mixing chamber 329, being directed substantially oppositely to one another (FIG. 3c). The edges of the cutouts 326 and 327 act as control edges 330 and 331 (FIG. 3e). In this position, the return bores 324 and 325 in the housing bores 314 and 315 are completely closed. By contrast, in the rest position, the axial slide valves 316 and 317 are longitudinally displaced in such a way that the injection openings 322 and 323 in the housing bores 314 and 315 are completely closed (FIG. 3b), whilst the return bores 324 and 325 coincide with the connections 332 and 333 of the return pipes 310 and 311, so that the reaction components are circulated while the pumps continue to function.

The axial slide valves 316 and 317 are provided with an adjusting drive 334. This adjusting drive consists of a pneumatically actuated compression chamber 359 which is provided in the housing section 312 and which communicates with the housing bores 314 and 315. The heads of the axial slide valves 316 and 317 are in the form of working pistons.

Return springs 360 and 361 return the axial slide valves 316 and 317 into their starting position. When actuated, the axial slide valves 316 and 317 are pressed against the return springs 360 and 361 and come into contact with a travel stop 348 in the form of stop pins 342 and 342' which are separately adjustable by means of micrometer screws 343 and 343'. Thus, despite the common adjusting drive 334, the axial slide valves 316 and 317 can be simultaneously displaced to different extents, with the result that, by comparison with the embodiment shown by way of example in FIG. 2a to 2f, the injection pressure of each component can with advantage be separately adjusted at different levels. The return bores 322 and 323 simultaneously function as throttle zones 345 and 346.

In addition, a stripping means 347 is provided which is identical with the actuating means 334 and which, after the operation and return of the axial slides 316 and 317, limits their stroke by means of an associated travel stop 349 so that, during the stripping movement of the slides 316 and 317, the injection openings 322 and 323 remain covered by the walls of the housing bores 314 and 315. The travel stop 349 consists of a yoke 362 with two hollow shafts 363 and 364 which are concentrically guided on the stop pins 342 and 343 and which are directed towards the axial slide valves 316 and 317, whilst, on the other side of the yoke 362, there is a piston 365 guided in a compression chamber 366. After the mould-filling operation, the travel stop 349 can be engaged either by hand or automatically through the admission of pressure to the compression chamber 366. Through actuation of the stripping means 347, the axial slides 316 and 317 make a short stroke until they come into contact with the travel stop 349. As a result, the residue of reacted mixture left in the mixing chamber 329 is detached from the contacted surfaces 350 and 351 of the axial slide valves 316 and 317.

The mixing chamber 329 widens on all sides and is open at its wide end 352. The mixer 307 is applied to a mould 309 (FIG. 3b and c) whose inlet opening 353 adjoins the mixing chamber 329. A sprue 354 leads to the mould cavity 355. A dividing plane 356 runs between the mixer 307 and the mould 309 so that, when the mixer 307 is stopped, the moulding can be removed from the mould as a unit with the sprue and reacted contents of the mixing chamber.

FIG. 3e illustrates a widening mixing chamber 329, in which the control edges 330 and 331 are arranged obliquely of the direction of movement of the axial slide valves 316 and 317.

Figure 4A:
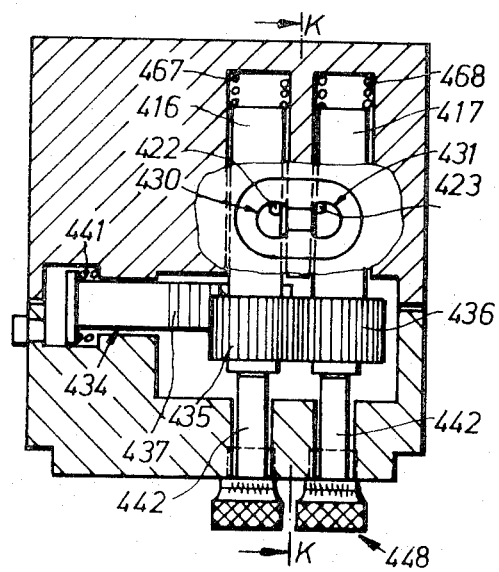
FIG. 4a shows a third embodiment of the mixer with rotary slide valves and an axial adjusting mechanism in partial longitudinal section on the line I—I in FIG. 4b.
Figure 4B:
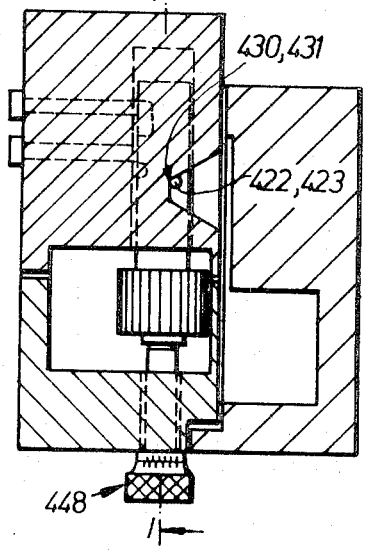

The embodiment illustrated by way of example in FIGS. 4a and 4b is a combined modification of the embodiments shown in FIGS. 2a to 2f and FIGS. 3a to 3e.

As in the embodiment shown by way of example in FIGS. 2a to 2f, changeover between the working position and rest position is carried out by an adjusting drive 434 which consists of a hydraulically displaceable rack 437 with a return spring 441. The rack 437 meshes with the gear wheel 435 of a rotary slide valve 416 which engages in the gear wheel 436 of a second rotary slide valve 417.

However, adjustment of the injection pressures for the components is carried out by an adjusting mechanism 448 in accordance with the embodiment shown in FIGS. 3a to 3e. This adjusting mechanism 448 consists of adjusting pins 442 and 442' which bear against the lower end faces of the rotary slide valves 416 and 417. Return springs 467 and 468 bear against the upper end faces of the rotary slide valves 416 and 417. Accordingly, the free cross sections of the injection openings 422 and 423 are adjusted by axial displacement of the rotary slide valves 416 and 417 in relation to the control edges 430 and 431 whilst the changeover from open to closed is carried out by a rotary movement.

This embodiment does not have a stripping means with a travel stop. However, these additional features can assume a form similar to that in the embodiment shown in FIGS. 2a to 2f.

Figure 5A:
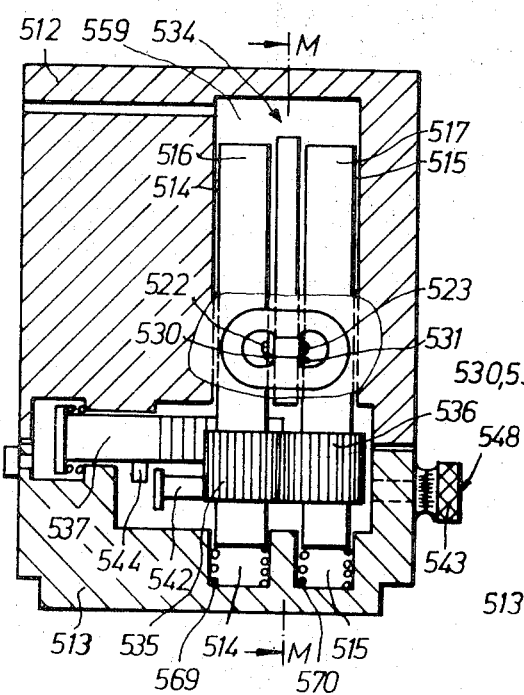
FIG. 5a shows a fourth embodiment of the mixer with axial slide valves and a rotary adjusting mechanism in partial longitudinal section on the line L—L in FIG. 5b.
Figure 5B:
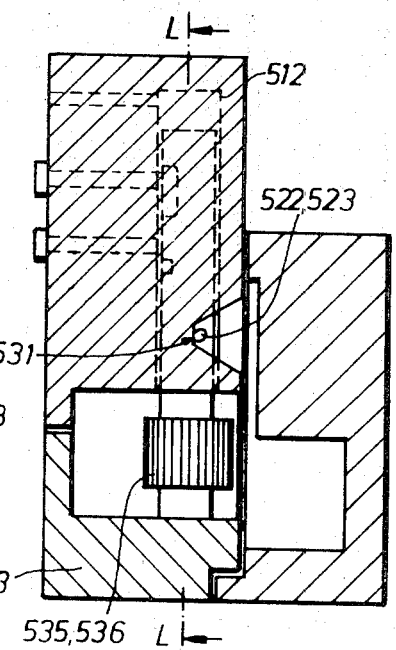

FIGS. 5a and 5b show another combined modification of the embodiments shown by way of example in FIGS. 2a to 2f and FIGS. 3a to 3e.

As in the embodiment shown by way of example in FIGS. 3a to 3e, changeover between the working position and rest position is carried out by an adjusting drive 534 which consists of a hydraulic compression chamber 559 into which project the piston-like ends of axial slide valves 516 and 517. The housing bores 514 and 515 of the housing section 512 are extended into the housing section 513 in which the lower ends of the axial slide valves 516 and 517 are guided and loaded by return springs 569 and 570. In this case, the injection pressures for the components are adjusted in accordance with the embodiment shown in FIGS. 2a to 2f. A hydraulically displaceable rack 537 comprises a stop 544. This rack meshes with a gear wheel 535 of the axial slide valve 516 which engages in a gear wheel 536 of the axial slide valve 517. A stop pin 542 adjustable by means of a micrometer screw 543 corresponds with the stop 544. These elements form the stop mechanism 548. In this way, it is possible to adjust the free cross sections of the injection openings 522 and 523 in relation to the control edges 530 and 539 and, hence, the injection pressures for the components.

Figure 6A:
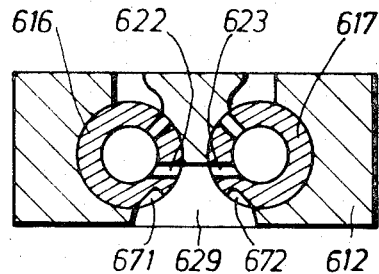
FIG. 6 shows a particular embodiment of the mixer with rotary slide valves in cross-section with the slide-valve positions a) mixing position, b) rest position and c) ejection position.
Figure 6B:
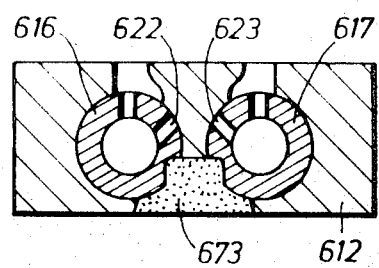
Figure 6C:
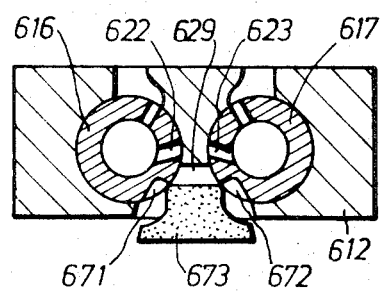

In FIGS. 6a to 6c, the rotary slide valves 616 and 617 are provided with cavities 671 and 672. By virtue of these cavities the mixture residue 673 reacted in the mixing chamber 629 can readily be pushed out of the mixing chamber (FIG. 6c). In FIG. 6a, the components are injected into the mixing chamber 629 through injection openings 622 and 623. At the end of the working phase, the rotary slide valves 616 and 617 are turned into the position shown in FIG. 6b, so that the injection openings 622 and 623 in the housing 612 are completely closed. The mixture is still liquid during rotation. Simultaneously with removal of the moulding, i.e. on completion of the reaction, the rotary slide valves 616 and 617 with their injection openings 622 and 623 are turned back towards the mixing chamber 629, but only to such an extent that the injection openings 622 and 623 are still covered in the housing 612. At the same time, the fully reacted mixture residue 673 is forced out of the cavities 671 and 672 and out of the mixing chamber 629. In this way, the mixture residue 673 is readily prevented from adhering to the wall of the mixing chamber.

Figure 7A:
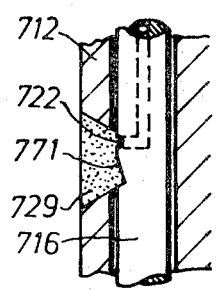
Fig. 7 shows a particular embodiment of the mixer with axial slide valves in longitudinal section with the slide-valve positions a) mixing position, b) rest position, c) ejection position.
Figure 7B:
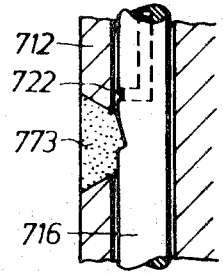
Figure 7C:
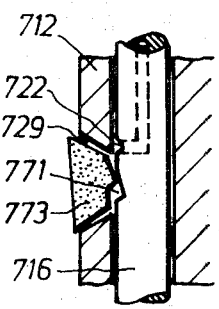

FIGS. 7a to 7c show only a single axial slide valve 716. The second axial slide valve is identical in design. In FIG. 7a, the axial slide valve 716 guided in the housing 712 points into the mixing chamber 729 with its injection opening 722. Below the injection opening 722 there is a cavity 771. On completion of the working phase, the axial slide valve 716 is moved into the rest position shown in FIG. 7b for as long as the mixture is still liquid. When the moulding is removed from the mould, the axial slide valve 716 is moved back, but only to such an extent that the injection opening 722 is still covered in the housing 712, as shown in FIG. 7c. By suitably shaping the cavity 771, a force component acts on the fully reacted mixture residue 773 during return of the axial slide valve 716 and detaches it from the wall of the mixing chamber 729.

What we claim is:

1. An apparatus for mixing at least two liquid reaction components, and molding the resulting reaction product comprising a storage container for each reaction component, delivery pipes which lead from each storage container to a mixer comprising a mixing chamber, a slide valve being arranged at the end of each delivery pipe, the slide valves being coupled with one another for movement, wherein each slide valve comprises an injection opening and is arranged in a cut-out in opposite walls of the mixing chamber, so that part of the wall surface of the slide valve forms the wall of the mixing chamber and the injection openings may be aligned with the cut-outs.

2. An apparatus as claimed in claim 1, wherein the slide valves are in the form of rotary slide valves.

3. An apparatus as claimed in claim 2, wherein the rotary slide valves comprise interengaging gear wheels, one of which meshes with a rack provided with an adjusting drive.

4. An apparatus as claimed in claim 2 wherein the edges of the cutouts in the wall of the mixing chamber are in the form of control edges and the rotary slide valves comprise independent axial adjusting means.

5. An apparatus as claimed in claim 1, wherein the slide valves are in the form of axial slide valves.

6. An apparatus as claimed in claim 5, wherein the axial slide valves are connected to a hydraulic or pneumatic adjusting means.

7. An apparatus as claimed in claim 5 wherein the edges of the cutouts in the wall of the mixing chamber are in the form of control edges and the axial slide valves comprise a rotary adjusting means.

8. An apparatus as claimed in claim 1 wherein the edges of the cutouts in the wall of the mixing chamber are in the form of control edges and an adjustable stop mechanism is associated with the slide valves in the working position direction, that is when the injection openings are aligned with the cutouts.

9. An apparatus as claimed in claim 8, wherein the control edges are inclined to the vertical.

10. An apparatus as claimed in claim 1 wherein the slide valves comprise return bores which correspond with return pipes which connect the mixer to the storage containers.

11. An apparatus as claimed in claim 10, wherein each return pipe has a throttle zone.

12. An apparatus as claimed in claim 11, wherein the free cross sections of the throttle zones in each slide valve are adjustable.

13. An apparatus as claimed in claim 10, wherein the return bores of the slide valves are in the form of throttle zones.

14. An apparatus as claimed in claim 1 wherein a dividing plane runs through the mixing chamber.

15. An apparatus as claimed in claim 1 wherein each slide valve has a cavity therein for pushing mixture residue out of the mixing chamber.

* * * * *